(12) United States Patent
Van Sickle

(10) Patent No.: US 7,156,226 B1
(45) Date of Patent: Jan. 2, 2007

(54) MULTI-COMPARTMENT STORAGE CONTAINER

(76) Inventor: Matthew C. Van Sickle, 4045 NE. 92nd St., Seattle, WA (US) 98115

( * ) Notice: Subject to any disclaimer, the term of this patent is extended or adjusted under 35 U.S.C. 154(b) by 258 days.

(21) Appl. No.: 10/834,949

(22) Filed: Apr. 28, 2004

Related U.S. Application Data

(60) Provisional application No. 60/466,977, filed on Apr. 30, 2003.

(51) Int. Cl.
*B65D 77/00* (2006.01)
*B65D 1/24* (2006.01)

(52) U.S. Cl. ............... 206/216; 206/1.5; 220/507; 220/524; 219/115; 211/78

(58) Field of Classification Search ........... 206/216, 206/1.5, 499; 220/506, 507 X, 500, 524 X, 220/510; 219/109, 110, 115 X; 211/131.1, 211/131.2, 78 X, 58, 163
See application file for complete search history.

(56) References Cited

U.S. PATENT DOCUMENTS

| | | | | |
|---|---|---|---|---|
| 1,425,264 A | * | 8/1922 | Loeb | 434/304 |
| 1,600,687 A | * | 9/1926 | Mantz | 229/120.23 |
| 3,132,652 A | * | 5/1964 | Gazdik | 132/297 |
| 3,967,772 A | * | 7/1976 | Baker | 229/110 |
| 4,083,452 A | * | 4/1978 | Rossmo | 206/533 |
| 4,775,055 A | | 10/1988 | Morse | |
| 4,838,625 A | * | 6/1989 | Taylor | 312/249.5 |
| 5,240,788 A | | 8/1993 | Eales | |
| 5,782,359 A | * | 7/1998 | McAllister et al. | 206/538 |
| 6,276,162 B1 | | 8/2001 | Schemel | |

* cited by examiner

*Primary Examiner*—Jila M. Mohandesi
(74) *Attorney, Agent, or Firm*—Gregory J. Nelson

(57) ABSTRACT

A multi-compartment container for storage of food, personal and miscellaneous items. The container has a base with a bottom and a circular sidewall. Radial dividers for a plurality of generally pre-shaped individual compartments which may be integral or removable. An access opening with a closure is provided for each compartment. The center of the container defines a through aperture which may be used for support in a position of use or for receiving an accessory such as a small battery-powered light.

6 Claims, 3 Drawing Sheets

MULTI-COMPARTMENT STORAGE CONTAINER

CROSS-REFERENCE TO RELATED APPLICATION

This application is based on provisional patent application Ser. No. 60/466,977, filed Apr. 30, 2003, entitled Multi-Compartment Storage Container.

FIELD OF THE INVENTION

The present invention relates to a storage container and more particularly to a multi-compartment storage container for storing food, beverages, spices as well as hardware, craft and other items for home and recreational use.

BACKGROUND OF THE INVENTION

Campers, backpackers and hikers often carry items such as dried food, beverage mixes, spices and the like in small plastic containers which can be placed in a knapsack or backpack. These containers may be variously shaped and due to their shape may be difficult to pack. Further, if the user has a number of such containers it becomes necessary for the user to rummage through the entire knapsack or backpack to locate a particular container which the individual wishes to use.

Similarly, individuals will also store hardware and craft items such as small nails, screws, staples and similar items in small boxes or containers which can easily become lost or misplaced. Organizers for such items can be found in the prior art, but these generally are containers having a number of trays, usually of clear plastic. While organizers of the type will help to assist in the orderly storage of some items, they do not lend themselves to convenient portability.

In view of the foregoing, there exists a need for a multi-compartment container which can contain liquids, medications, spices, dried food products, personal items, hardware, travel items and the like, which device is strong, secure and portable.

BRIEF SUMMARY OF THE INVENTION

Briefly, the present invention relates to a multi-compartmented container which has a base with an outer, sidewall and a flat bottom surface. A cylindrical opening is positioned at the center of the container. A plurality radial side walls extend from the center outwardly defining a plurality of compartments which, in a preferred embodiment, are pre-shaped. The compartments may be of various sizes to hold different quantities of items. In one embodiment, each container is provided with a closure such as a screw or cap. The individual containers are sized to nestibly fit in the various compartments. When all the containers are positioned within the base, a generally planar working surface is defined by the upper surface of the multiple containers. The individual containers can be filled with various items as required by the user. Access to the containers can be easily achieved by removing a selected container from a nested position in the compartment and removing the cap to either fill the container or to remove a portion of the contents from the container.

In another embodiment, the compartments are integrally formed as part of the base enclosed by an upper planar surface. Spouts extend radially from the outer peripheral wall of the base, each having a closure such as a screw cap ad may have a shaker cap beneath the closure.

The various embodiments of the invention are preferably sized to conveniently fit within a knapsack, backpack or within a cooking utensil within the backpack. A circular aperture at the center of the allows the device to be positioned on a stake, suspended by a rope. The circular aperture can also be equipped with an accessory such as a light, funnel, compass or other useful device. Preferably the container is fabricated from a rigid or semi-rigid, durable plastic.

BRIEF DESCRIPTION OF THE DRAWINGS

The above and other objects of the present invention will become more apparent from the following description, claims and drawings in which:

DETAILED DESCRIPTION OF THE DRAWINGS

Figure 1:
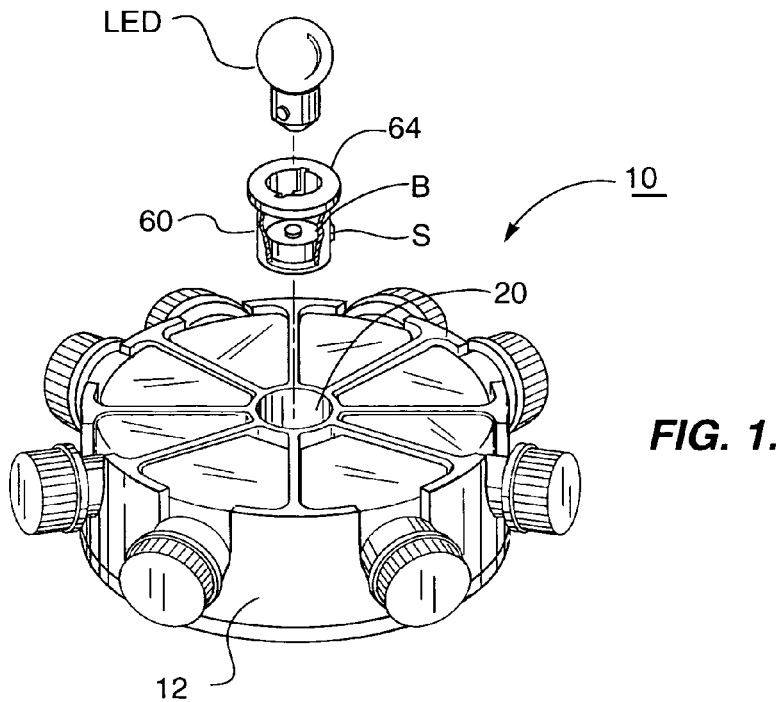
FIG. 1 is a perspective view of an embodiment of the multi-compartmented container of the present invention.

Turning to the drawings, particularly FIGS. 1 to 4, a preferred embodiment of the invention shown and is generally designated by the numeral 10. The container 10 has a base 12 with a circular, peripheral wall 14 and a generally flat or planar bottom 16. A generally cylindrical section 20 is located at the center of the base 12. The center section 20 defines a generally cylindrical opening or passageway 25.

A plurality of radially extending walls 22 to 22G extend from the central cylindrical section 20 to the interior of the peripheral outer wall 14 of the base. The radial walls define a plurality of compartments 24 to 24G. The radially extending walls may be positioned to establish compartments of varying size. Each compartment is generally triangular in shape being slightly truncated at its inner end by the wall of the cylindrical section 25.

Located at a central position with respect to each of the compartments 24, 24A, etc., is a U-shaped recess 26 to 26G. For example, U-shaped recess 26 is provided in the wall 14 at the center of compartment 24. Similar recesses 26A, 26B, etc., are provided around the circumference of the outer wall 14 each opening into the adjacent compartment.

An individual container 30, 30A, 30B, etc., is provided for each of the compartments. Each of the individual containers has an upper, generally triangular surface 32, a bottom 34, arcuate front wall 36 and opposite converging side walls 38 and 40. The side walls 38 and 40 are truncated at rear wall 42. The neck of a spout 44 projects from the front wall at each compartment having an associated closure 48. The closure may be a snap-on closure, but preferably is internally threaded having threads 52 which will engage threads 54 on the neck of the spout.

Figure 2:
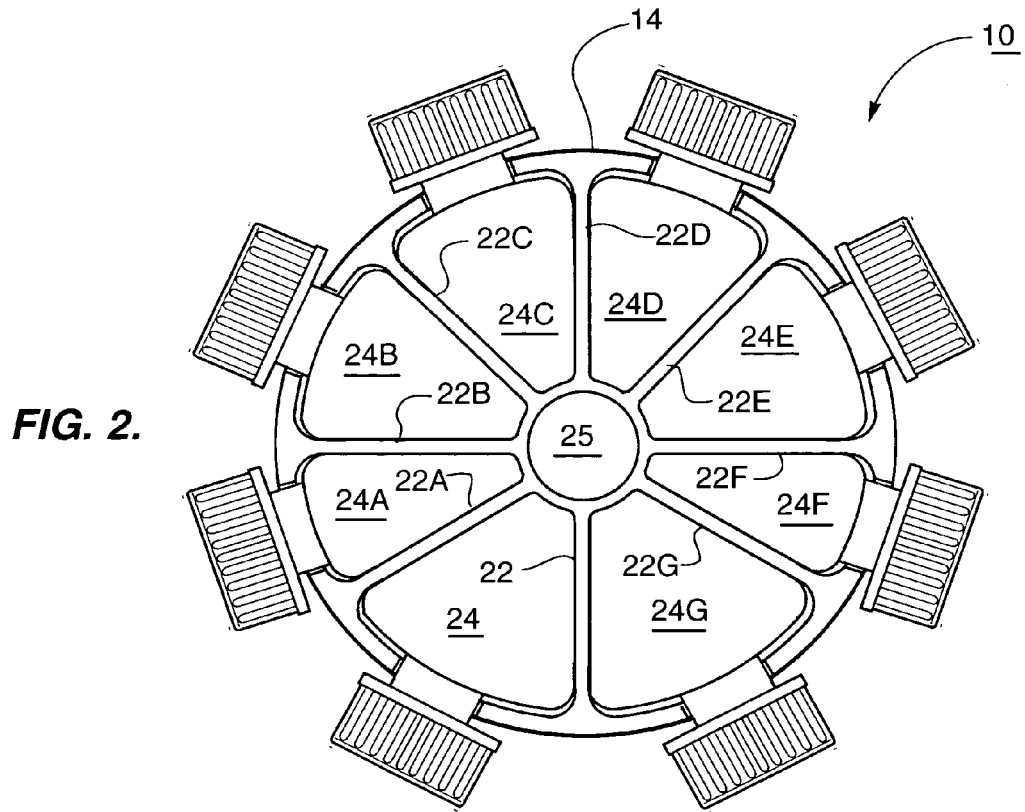
FIG. 2 is a top view of the multi-compartmented container shown in FIG. 1.
Figure 3:
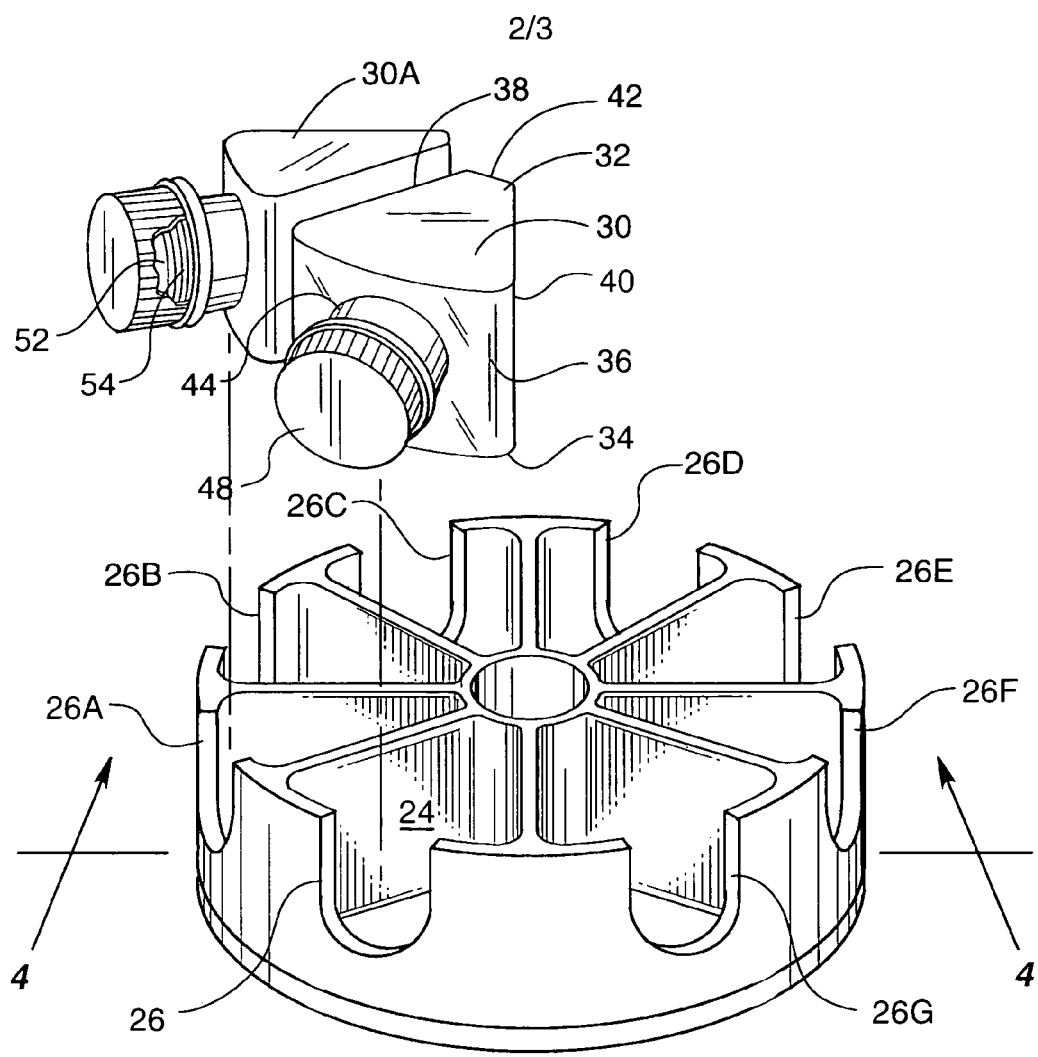
FIG. 3 is an exploded view of the multi-compartmented container shown in FIGS. 1 and 2.
Figure 4:
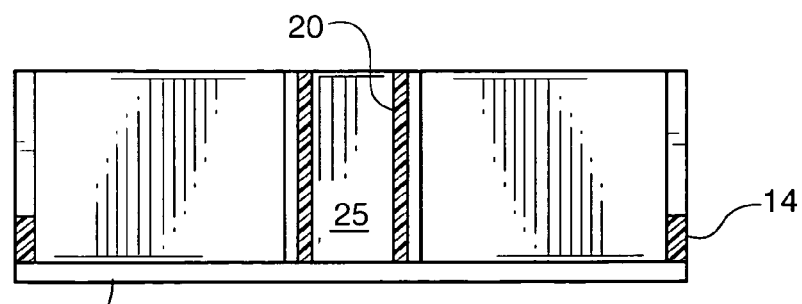
FIG. 4 is a sectional view taken along line 4—4 of FIG. 3.

When the multi-compartmented container is fully assembled, as appears in FIGS. 1 and 2, each of the multiple compartments receives an individual container such as containers 30, 30A, 30B, which are nestably received in the compartment with the circular spout received in the associated U-shaped recess and projecting through the wall 14.

The user may fill each of the compartments with desired contents. For example, a camper can fill the compartments with various spices, dried foods, and liquids such as shampoos or soaps. Each compartment can be securely closed by the closure. Preferably the container base, as well as each of the individual compartments, are fabricated from a suitable rigid or semi-rigid, durable material such as a food grade, transparent plastic such as an acrylic. When the multi-compartment container is filled, the container can then be easily stowed in a backpack. The circular configuration and the container dimensions conventionally fit within the interior of other items in the backpack the user may wish to carry such as a cooking utensil or pan. Accordingly, it is preferred that the overall diameter be approximately 5" to 12" inches.

When the user wishes to access a contained item, the individual container, such as container 30, can be removed and the item dispensed as needed and then returned to the base. For convenience, the multi-compartmented container 10 can be suspended from an overhead structure such as a tree branch by running a line through the center aperture 25 and tying a knot in the line which will abut the bottom surface of the container. The container may also be placed on a post or stake which may allow the container to be rotated for convenience of use and accessibility to the various compartments. The overall shape and configuration lend self to easy cleaning. Multiple units can be stacked on a post or a stake.

Referring again to FIG. 1, the center aperture 25 can also be used to removably house an accessory device such as a small light. In FIG. 1, a circular housing 60 contains one or more batteries B and a small LED. The housing preferably is transparent having a covering or lens across its upper end. The housing 60 is sized so that it may be inserted within the center aperture 25 and supported along the upper rim of the aperture by annular flange 64. Thus, the accessory light can be switched on by a suitable switch S. The lamp, batteries and switch are wired in a circuit such as a circuit that exists in conventional flashlights. With the lamp switched on, the light can provide illumination for a camping area and will also provide illumination to assist individuals in identifying and accessing the contents of the various compartments within the multi-compartment container. The light can be removed and used as a hand-held flashlight.

Figure 5:
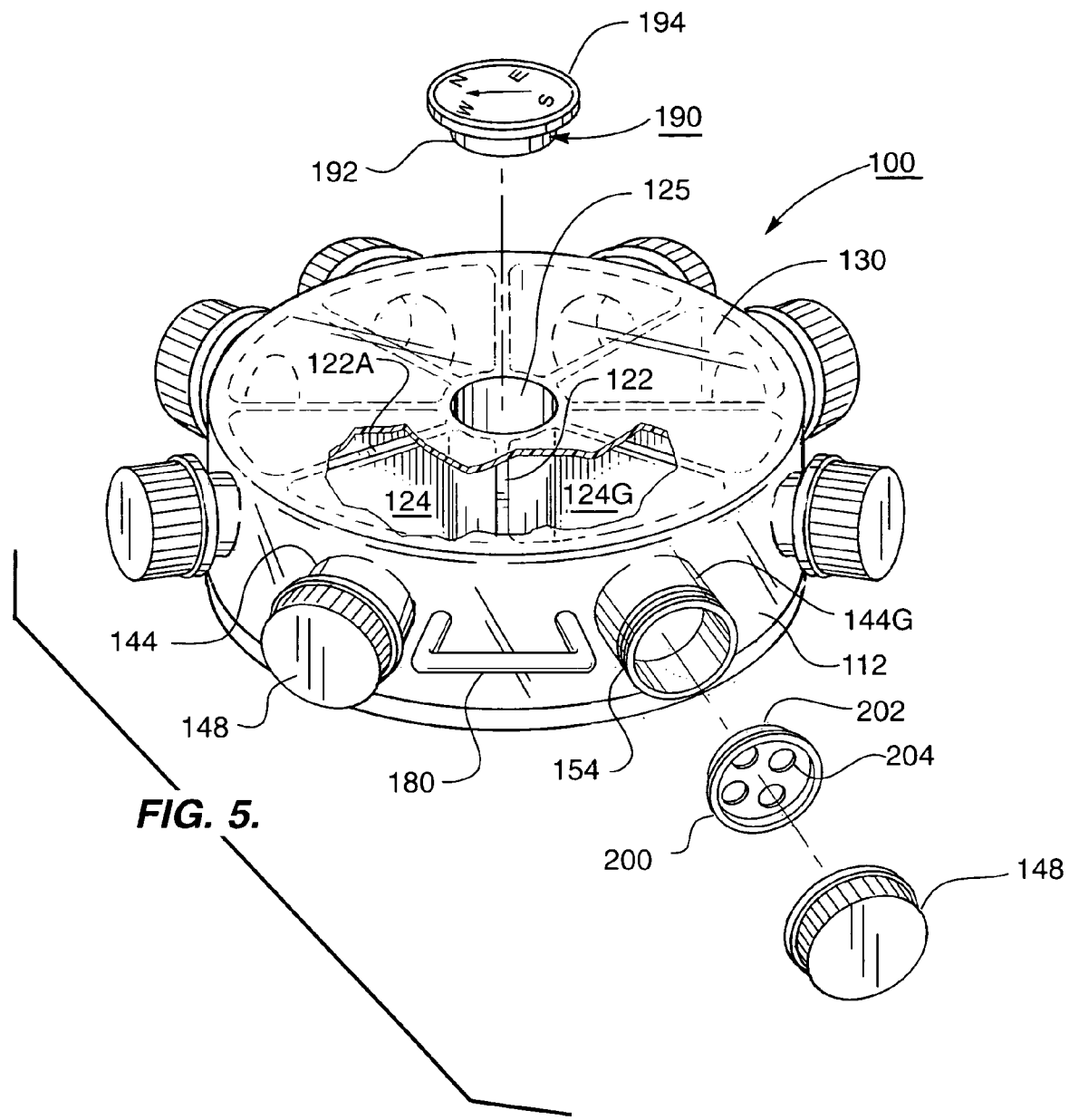
FIG. 5 is a perspective view of an alternate embodiment of the container of the present invention.

FIG. 5 shows an alternate embodiment of the present invention, generally designated by the numeral 100. Container 100, again, has upstanding, generally circular, side wall 112 and a bottom 114. A top surface 130 extends across the top of the sidewall forming an inner chamber which is subdivided into a plurality of individual compartments 124, 124A, etc. The individual compartments are each generally triangular, the cross section being slightly truncated at the inner end. The compartments formed by the radial side walls 122, 122A may be of various sizes.

A spout 144, 144A, etc., extends from each of the compartments to provide access to the compartment. A closure 148 is associated with each of the spouts and may be either a snap-on or screw cap and provided with a tether 145. Thus, each of the compartments can be filled with a liquid, spice powder or other item by the user and the compartment closed by the closure. The contents of a selected compartment can be accessed by removing the closure and the contents can be discharged or emptied when needed.

Selected compartments, such as compartment 124G, can be provided with a shaker top 200 as seen in FIG. 5. The shaker top has an annular edge which snugly fits into the spout. The shaker top has a plurality of holes 204, for example three to five, to allow the contents to be dispensed through the holes. The shaker may be removed if desired and replaced on a spout when required.

The central aperture 125 provides a location from which the multi-compartment container may be suspended on a rope or positioned on a stake. The dimensions are selected so the multi-compartment container can easily fit into a backpack or within a cooking utensil.

A handle 180 may extend from the side wall for convenience of carrying and portability.

The central aperture may also receive various accessory items such as the light module such as light 60 shown and described with respect to FIGS. 1 to 4. Alternatively, the center aperture 125 may receive an accessory such as compass 190 which is shown having a cylindrical housing 192 which will seat received within the aperture. The compass is held is place by a circular rim 194 engaging the upper planar surface of the container.

From the foregoing, it will be seen that the container of the present invention is a multi-compartment and container which will allow the user to hold different amounts of a variety of items. The compartments can be filled with liquids or solids and secured by an appropriate closure. The device is compact for storage and portability and may also be used as a food preparation or work surface if necessary. Various accessories such as a compass or lights for illumination can be provided which will cooperate with an opening or aperture in the compartment.

Although the invention has, in a preferred embodiment, been described as having a circular configuration, the outer sidewall may be polygonal such as embodiment 200 shown in FIG. 5 having a hexagonal sidewall 214 and a plurality of compartments 224, 224A, etc.

It will be obvious to those skilled in the art to make various changes, alterations and modifications to the invention described herein. To the extent these various changes, alterations and modifications do not depart from the spirit and scope of the appended claims, they are intended to be encompassed therein.

I claim:

1. A multi-compartmented container comprising:
   (a) a base having:
      (i) a bottom wall and a circular side wall;
      (ii) a generally cylindrical center section extending upwardly from said bottom wall;
      (iii) a plurality of divider walls extending radially between said center section and said side wall defining a plurality of compartments each having a container with a spout;
   (b) closure means associated with each spout; and
   (c) a removable apertured shaker cap associated with at least one of said containers.

2. The multi-compartmented container of claim 1 wherein said containers are removably positioned in each said compartment.

3. The multi-compartmented container of claim 1 wherein said central section removably receives an accessory article.

4. The multi-compartmented container of claim 1 wherein said base is a transparent plastic.

5. The multi-compartment container of claim 1 wherein said sidewall is circular.

6. The multi-compartment container of claim 1 wherein said sidewall is polygonal.

* * * * *